Figure 1A:
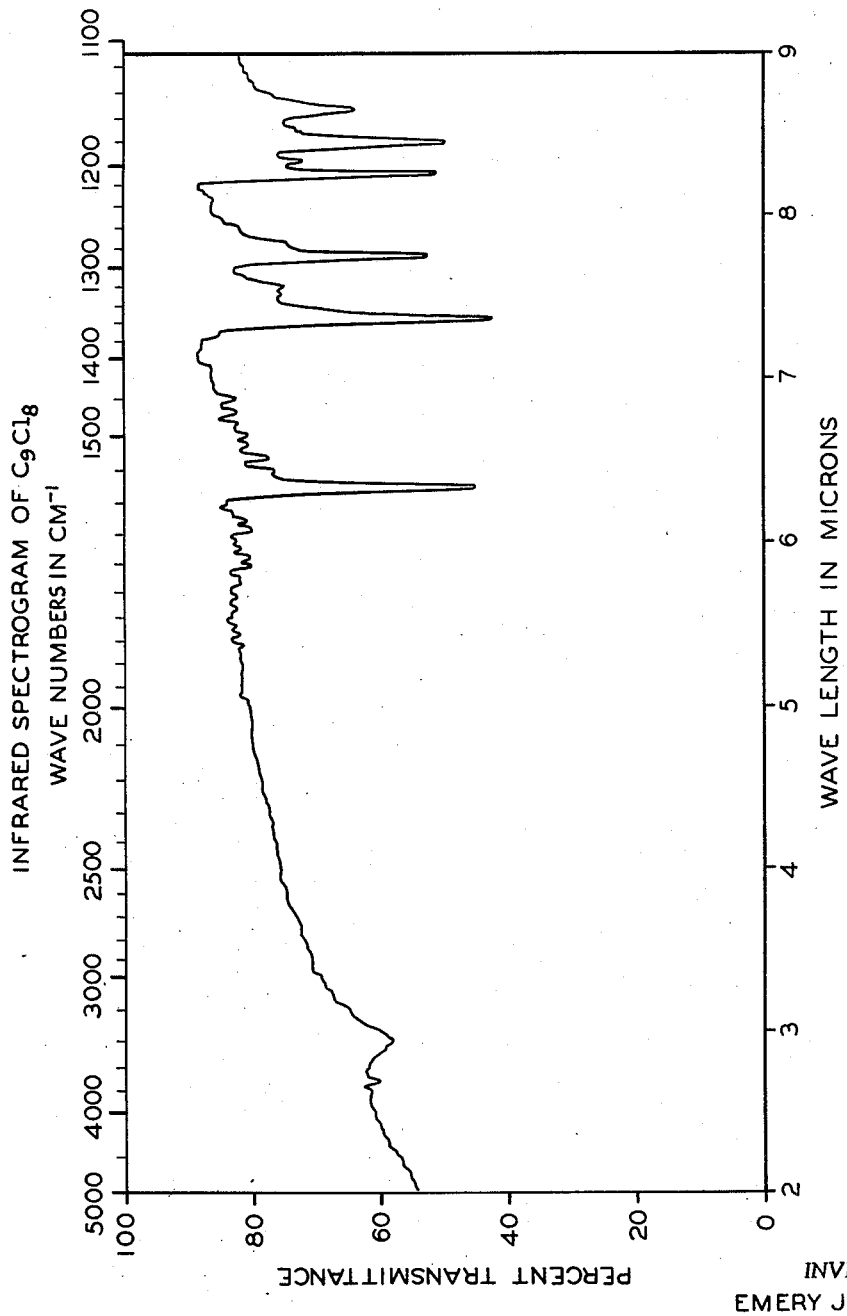

Sept. 29, 1959 E. J. CARLSON 2,906,662
METHOD FOR COMBATING FUNGUS EMPLOYING $C_9Cl_8$
Filed May 6, 1958 2 Sheets-Sheet 1

INVENTOR.
EMERY J. CARLSON
BY
*Roger J. Drew*
ATTORNEY

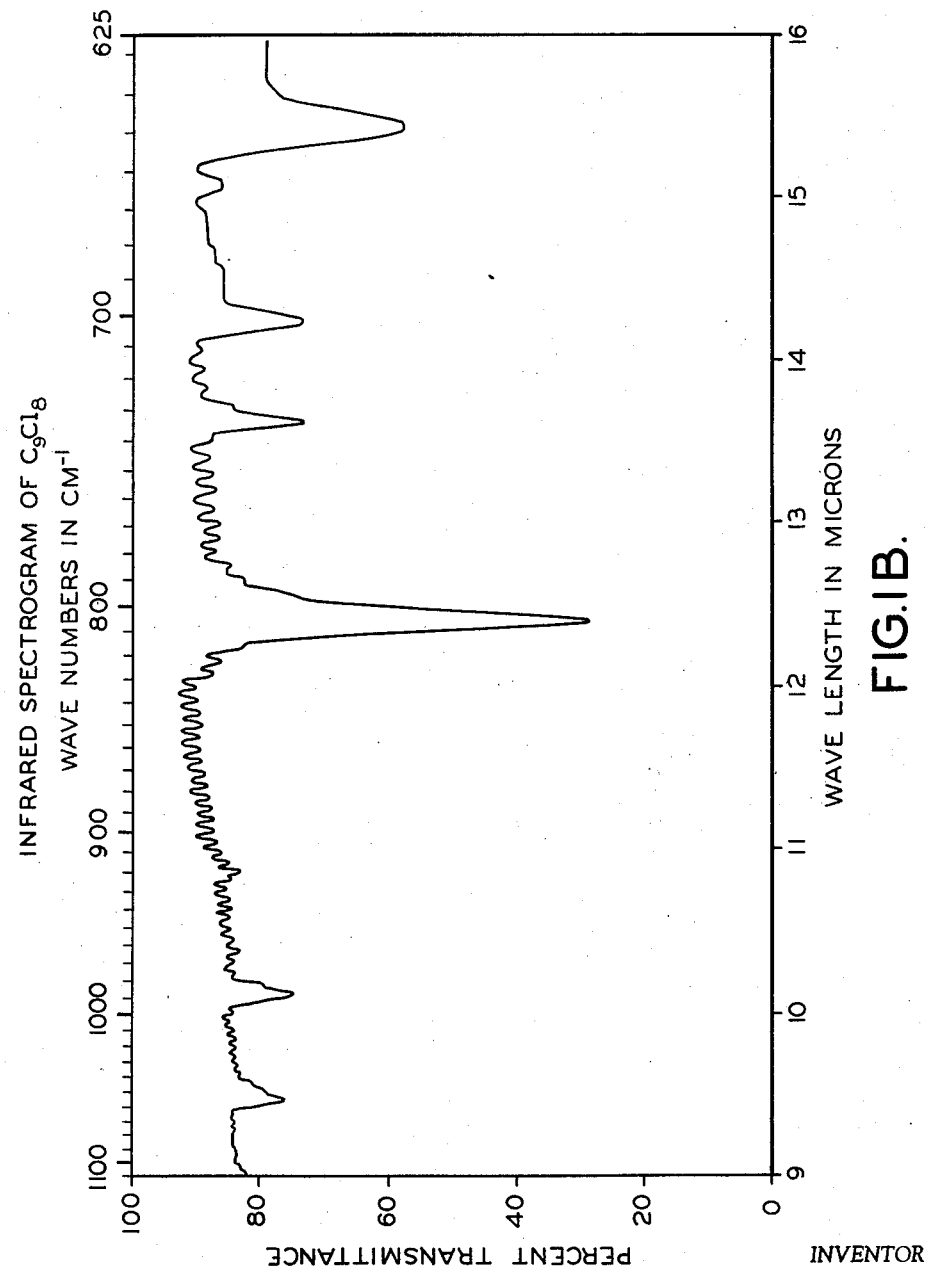

2,906,662
Patented Sept. 29, 1959

2,906,662
METHOD FOR COMBATING FUNGUS EMPLOYING $C_9Cl_8$

Emery J. Carlson, Summit, N.J., assignor to Allied Chemical Corporation, a corporation of New York Application May 6, 1958, Serial No. 733,374

5 Claims. (Cl. 167—22)

This invention relates to a novel chlorocarbon and to a method for combating fungus therewith.

The chlorocarbon of the instant invention has the empirical formula $C_9Cl_8$ and is characterized by being a pale yellow, odorless, crystalline solid of melting point of substantially 132° C.–133° C. It is soluble in carbon tetrachloride and diethyl ether, and slightly soluble in acetone, xylene and lower aliphatic alcohols, e.g. ethanol, methanol and isopropanol. The chlorocarbon is insoluble in water. It has the characteristic infrared spectrogram hereinafter described in detail. The novel chlorocarbon has the following analysis as compared to theoretical for $C_9Cl_8$:

|  | Percent theory ($C_9Cl_8$) | Percent found | |
|---|---|---|---|
| C | 27.5 | 27.0 | 27.3 |
| Cl | 72.5 | 72.0 | 73.5 |
| H | 0 | 0 | 0 |
| Mol. weight | 392 | 387 | 404 |

The compound was concluded to be $C_9Cl_8$ on the basis of the foregoing analysis and the infrared spectrogram hereafter described.

One source of the compound of the invention is the ketonic $C_{10}Cl_{10}O$ compound obtained by condensing two molecules of hexachlorocyclopentadiene with the aid of sulfur trioxide to form a hexachlorocyclopentadiene—$SO_3$ reaction product, and hydrolyzing the reaction product to the ketone. Its preparation is more fully described in Gilbert et al. U.S. Reissue Patent 24,435 of February 25, 1958.

The instant chlorocarbon can be prepared by prolonged destructive distillation of the ketonic compound having the empirical formula $C_{10}Cl_{10}O$ at a temperature above 350° C. condensing the vaporous products to obtain an oily slurry or slush, thereafter solvent extracting the oily slush in suitable organic liquid solvent, e.g. methanol, ethanol or isopropanol, and then cooling to stratify the solution into upper and lower superposed oily layers or phases. Yellow crystals of $C_9Cl_8$ chlorocarbon separate from the lower phase, which crystals are then recovered and purified by filtration, recrystallizing, etc.

The following specific example further illustrates the invention, parts being by weight unless otherwise specified.

Forty (40) parts of purified ketonic compound having the empirical formula $C_{10}Cl_{10}O$ containing some water of hydration and obtained as previously described was placed in a glass flask fitted with a still head and an air condenser. The material was then heated by means of a Woods' metal bath at a bath temperature of 360° C. over a period of about 15 minutes. Some fuming occurred during this period and the contents of the flask liquefied, but only slight distillation occurred. The flask was then removed from the bath and heated with a free flame over a period of about 30 minutes to effect destructive distillation. Distillate collected in a receiver flask where it solidified to an oily slush. The oily slush was dissolved in warm 95% ethanol and, on cooling, 2 oily phases formed. Yellow crystals separated from the lower phase, which were filtered and washed first with cold ethanol and then with cold methanol. Recrystallization of the yellow crystals from isopropanol in the presence of decolorizing carbon gave a yield of 7 parts of pale yellow crystals of purified $C_9Cl_8$ chlorocarbon melting at 132° C.–133° C.

The infrared spectrogram of the chlorocarbon of the instant invention was measured and recorded to enable identification of the same. The infrared spectrogram curve of the chlorocarbon is shown in accompanying Figures 1A and 1B of the drawings, such curve being continued or shown in both drawings for purposes of clarity in showing detail. Such infrared spectrogram curve was prepared on a standard infrared recording spectrophotometer designed for measuring and recording the infrared transmission of solids, liquids, and gases, comprising a double infrared beam which scans the spectrum through the wave length range 2.0 to 16 microns, one part of the beam passing through a compensating cell. If the sample under study absorbs radiation, the two beams become unequal. The magnitude of this inequality is a measure of the transmission by the sample of the particular wave length. The record of these differences within the range of wave lengths scanned is the infrared spectrogram and is recorded as an ink drawn line showing absorption maxima and minima at specific wave numbers or frequencies expressed in reciprocal centimeters on a chart graduated in percent transmission as ordinates, in wave length as abscissae, and also showing wave numbers or frequencies.

The infrared spectrogram of the chlorocarbon was measured when the chlorocarbon was combined with potassium bromide in the form of pellets. Such pellets were prepared by first mixing 0.1 gram of the solid $C_9Cl_8$ chlorocarbon with 2 grams of solid potassium bromide, followed by grinding to a particle size passing through a 100 mesh sieve. Thereafter the ground mixture was pelleted under pressure of 15,000 p.s.i.g. The pellet was then placed in the spectrophotometer in the path of one of the beams as previously described.

The infrared spectrogram of any chemical compound serves as an accurate means for identifying the compound, and it has been compared with a human fingerprint in its ability to identify a compound with certainty. The characteristic reproducibility of the infrared spectrogram of a given compound is due to the fact that when a molecule is excited by infrared radiation, it absorbs energy to a greater degree at some wave lengths than at others, and that the amount of absorption depends on the configuration and the linkages of the atoms composing the molecule. As shown by the infrared spectrogram of the drawings, the chlorocarbon of this invention when combined with potassium bromide in pellet form exhibits characteristic absorption maxima at the following frequencies expressed in reciprocal centimeters: 1587, 1351, 1282, 1205, 1176, 1149, 1053, 990, 806, 735, 704, 662 and 649.

The chlorocarbon of this invention is characterized by being a highly effective fungicide, especially for combating plant disease fungus. Living plants or trees, e.g. peach, plum, cherry and apple trees, and tomato plants are protected from fungus or fungi attack by virtue of this invention without injury thereto. The chlorocarbon is utilized herein in fungicidal amount or amount sufficient to exert fungicidal action.

The instant chlorocarbon fungicidal agent or ingredient can be applied to the material susceptible to fungus attack, such as the aforesaid trees or plants, together with a carrier or diluent in the form of spray and dust compositions. Further, the chlorocarbon can be so compounded as to produce fungicidal concentrates adapted subsequently to be used in the preparation of spray or dust mixtures. Spraying or dusting of the plants or trees with the instant spray or dust fungicidal compositions is preferably to their foliage, stems and fruit (if present).

Fungicidal spray compositions can be in the form of aqueous dispersions or emulsions, or solutions of fungicidal active ingredient in organic liquid solvents e.g. acetone, xylene, or kerosene. Aqueous dispersions or emulsions have typical concentrations of from about .02% to 1% by weight of the chlorocarbon fungicidal ingredient. Solutions have typical weight concentrations of from about 0.5% to 20% of the novel chlorocarbon. Fungicidal concentrates can be in the form of water-dispersible powders adapted to be dispersed in water for spray application. Such powders typically contain, in proportions by weight, from about 20% to 80% of the instant chlorocarbon fungicidal ingredient, from about 0.5% to 3% of wetting and dispersing agents and the balance powdered solid carrier or diluent, e.g. talc, wood flour, kaolin, sulphur and pumice. The dispersible powders are dispersed in water in typical amounts of from ¼ to 8 pounds per 100 gallons of water.

Dust compositions comprise the chlorocarbon active fungicidal ingredient combined with solid powders or dusts, such as, for example, the powdered carrier materials previously set forth with regard water-dispersible fungicidal powders. Such compositions are adapted for application by dusting and typically contain from about 0.5% to 10% by weight of the chlorocarbon fungicidal ingredient.

Sprayable aqueous dispersions can be prepared by mixing with water solutions of the chlorocarbon fungicidal ingredient and an emulsifying agent in a water-miscible organic solvent, e.g., acetone. These solutions prior to dispersing typically contain, in proportions by weight, from about 20% to 80% of the chlorocarbon, from about 1% to 10% of emulsifying agent and the balance water-miscible solvent.

Water-dispersible powders can be prepared by grinding or milling the solid chlorocarbon active ingredient together with the solid carrier and wetting and dispersing agents to a typical particle size of from about 1 to 30 microns. Alternatively, the dispersible powder can be made by impregnation of the active agent on the powdered carrier as a melt or from solution.

Example of wetting and dispersing agents which may be used herein include sodium lignosulfonate; "Nacconol NR," an alkyl aryl sodium sulfonate; and "Aerosol OT," a di (2-ethylhexyl) sulfosuccinate sodium salt. Suitable emulsifying agents include "Triton X–151," an alkyl aryl polyether alcohol; and blends of "Triton X–151" and "Triton X–171," which are blends of alkyl aryl polyether alcohol with organic sulfonates.

The toxicity characteristics of the novel $C_9Cl_8$ chlorocarbon against various fungi are indicated by the following tests:

*Test 1.*—*Sclerotinia fructicola* (brown rot of stone fruit) spores were added to an aqueous dispersion containing 10 parts per million of the $C_9Cl_8$ chlorocarbon of this invention. A similar quantity of these spores were added to aqueous copper sulphate solution. The separate spore mixtures were incubated at 65° C. After an incubation period of 24 hours at 65° C. the mixture containing the instant chlorocarbon was examined under the microscope to determine percent germination of spores. No spore germination was noted in the mixture containing the chlorocarbon. On the contrary, a 93% spore germination was noted in the mixture containing copper sulphate.

*Test 2.*—The $C_9Cl_8$ chlorocarbon of this invention was dissolved in acetone to provide a solution of 1% concentration by weight. 0.5 part of "Triton X–155" emulsifying agent was then added to 100 parts of this fungicidal solution to improve or maintain emulsification on mixing with water. The solution was then diluted with water in the water to solution volume ratio of 9:1 respectively to provide a dispersion of 0.1% concentration by weight of fungicide. This aqueous dispersion was sprayed on live McIntosh apple trees of from 6 to 15 inches tall to cover the foliage with fine droplets. About 10 to 20 cc. of dispersion per tree was used. Inoculum of *Venturia inaequalis* (apple scab) conidia were obtained from active lesions on apple leaves from trees effected with the same and were atomized onto the sprayed tree after the spray had dried.

The amount of apple scab infection was recorded 14 days after the date of inoculation with *Venturia inaequalis* during which the trees had been subjected to high humidity and temperature conducive to fungus germination. The number of trees that showed infection and the estimated percentage of leaf area that was infected were recorded at this time and compared with data noted with respect to trees which were subjected to substantially identical conditions except that the fungicide of this invention was not applied to them. None of the apple trees which had been treated with the instant chlorocarbon compound was infected with apple scab, and there was no evidence of phytotoxicity. On the contrary, very untreated apple tree was infected with apple scab and 56% of the area of the leaves of each tree was infected with the fungus.

*Test 3.*—An aqueous dispersion of 0.1% concentration of $C_9Cl_8$ chlorocarbon of this invention was sprayed onto the foliage of live window box tomato plants of from about 4 to 6 inches tall. Approximately 10 to 20 cc. of dispersion per plant was used. Inoculum of *Phytophthora infestans* (tomato late blight) zoospores, which are pathogenic to tomatoes, was then atomized onto the sprayed plants after the spray had dried. The amount of plant defoliation was recorded 7 days after the date of inoculation with the fungus during which the tomato plants had been subjected to temperature and high humidity conducive to fungus germination. The estimated percentage of plant defoliation was recorded at this time and compared with data noted with respect to untreated plants which were subjected to substantially identical conditions of temperature and humidity conducive to fungus germination. No tomato plant which had been sprayed with the instant chlorocarbon fungicide showed defoliation, and there was no evidence of phytotoxicity. On the contrary the fungicide untreated tomato plants each showed from 90 to 95% defoliation.

What is claimed is:

1. A method of combating fungus which comprises applying to the material susceptible to attack by fungus a fungicidal composition containing as an essential toxic ingredient a chlorocarbon having the empirical formula $C_9Cl_8$ and characterized by being a pale yellow, odorless, crystalline solid having melting point of substantially 132° C.–133° C., being soluble in carbon tetrachloride and diethyl ether, slightly soluble in acetone, xylene, methanol, ethanol and isopropanol, insoluble in water, exhibiting characteristic absorption maxima in the infrared region, when combined with potassium bromide in pellet form, at the following frequencies expressed in reciprocal centimeters: 1587, 1351, 1282, 1205, 1176, 1149, 1053, 990, 806, 735, 704 and 662 and having a composition by weight of approximately 27.5% carbon and 72.5% chlorine.

2. A method of combating plant fungus which comprises applying to the plant to be protected from plant fungus a fungicidal composition containing as an essential toxic ingredient a chlorocarbon having the empirical formula $C_9Cl_8$ and characterized by being a pale yellow, odorless, crystalline solid having melting point of substantially 132–133° C., being soluble in carbon tetrachloride and diethyl ether, slightly soluble in acetone, xylene, methanol, ethanol and isopropanol, insoluble in water, exhibiting characteristic absorption maxima in the infrared region, when combined with potassium bromide in pellet form, at the following frequencies expressed in reciprocal centimeters: 1587, 1351, 1282, 1205, 1176, 1149, 1053, 990, 806, 735, 704 and 662 and having a composition by weight of approximately 27.5% carbon and 72.5% chlorine.

3. A method of protecting stonefruit trees against attack by brown rot of stonefruit which comprises applying to the tree to be protected therefrom a fungicidal composition containing as an essential toxic ingredient a chlorocarbon having the empirical formula $C_9Cl_8$ and characterized by being a pale yellow, odorless, crystalline solid having melting point of substantially 132–133° C., being soluble in carbon tetrachloride and diethyl ether, slightly soluble in acetone, xylene, methanol, ethanol and isopropanol, insoluble in water, exhibiting characteristic absorption maxima in the infrared region, when combined with potassium bromide in pellet form, at the following frequencies expressed in reciprocal centimeters: 1587, 1351, 1282, 1205, 1176, 1149, 1053, 990, 806, 735, 704 and 662 and having a composition by weight of approximately 27.5% carbon and 72.5% chlorine.

4. A method of protecting apple trees against attack by apple scab which comprises applying to the apple tree to be protected therefrom a fungicidal composition containing as an essential toxic ingredient a chlorocarbon having the empirical formula $C_9Cl_8$ and characterized by being a pale yellow, odorless, crystalline solid having melting point of substantially 132–133° C., being soluble in carbon tetrachloride and diethyl ether, slightly soluble in acetone, xylene, methanol, ethanol and isopropanol, insoluble in water, exhibiting characteristic absorption maxima in the infrared region, when combined with potassium bromide in pellet form, at the following frequencies expressed in reciprocal centimeters: 1587, 1351, 1282, 1205, 1176, 1149, 1053, 990, 806, 735, 704 and 662 and having a composition by weight of approximately 27.5% carbon and 72.5% chlorine.

5. A method of protecting tomato plants against attack by tomato late blight which comprises applying to the tomato plant to be protected therefrom a fungicidal composition containing as an essential toxic ingredient a chlorocarbon having the empirical formula $C_9Cl_8$ and characterized by being a pale yellow, odorless, crystalline solid having melting point of substantially 132–133° C., being soluble in carbon tetrachloride and diethyl ether, slightly soluble in acetone, xylene, methanol, ethanol and isopropanol, insoluble in water, exhibiting characteristic absorption maxima in the infrared region, when combined with potassium bromide in pellet form, at the following frequencies expressed in reciprocal centimeters: 1587, 1351, 1282, 1205, 1176, 1149, 1053, 990, 806, 735, 704 and 662 and having a composition by weight of approximately 27.5% carbon and 72.5% chlorine.

References Cited in the file of this patent
UNITED STATES PATENTS 2,786,062    Vollmann _____ Mar. 19, 1957

OTHER REFERENCES

Chem. Abs., 33, 4232(2), 1939.